Figure 1:
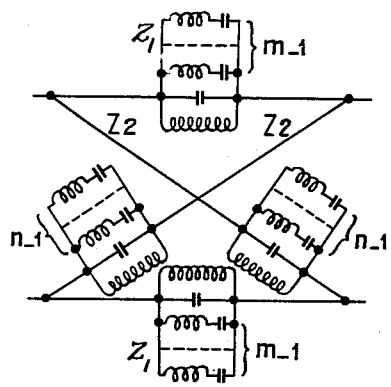
Figure 1:
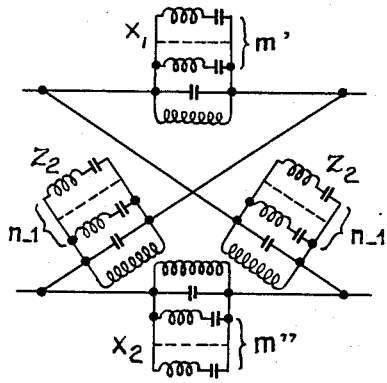

Dec. 7, 1954

R. P. LEROY 2,696,591

LATTICE-TYPE REACTIVE QUADRIPOLES

Filed Dec. 20, 1951

5 Sheets-Sheet 1

$(m'+m''=m+n-3)$

INVENTOR:
ROBERT PIERRE LEROY

BY:

$(m'+m''=m+n-3)$

INVENTOR:
ROBERT PIERRE LEROY

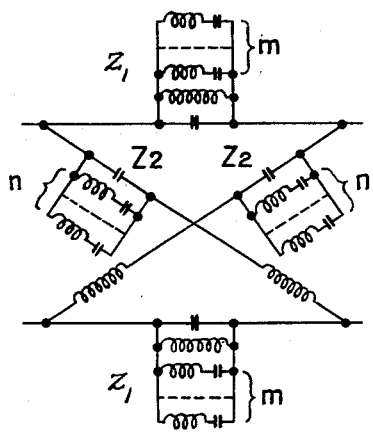
*Fig. 3*
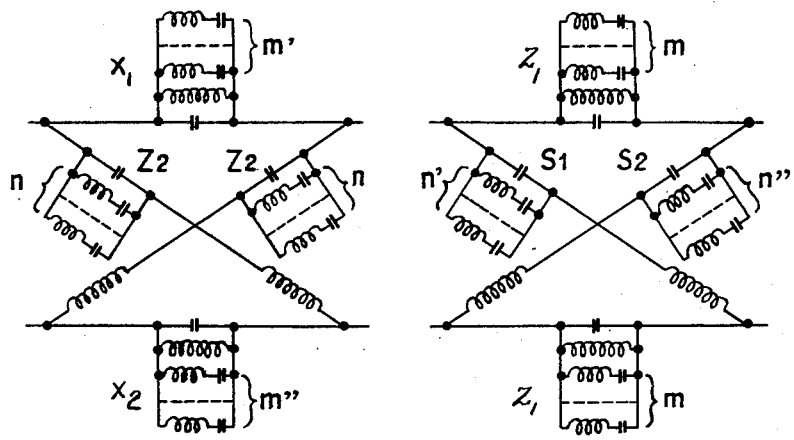
$(m'+m''=m+n)$      $(n'+n''=m+n)$
*Fig. 3'*      *Fig. 3''*
INVENTOR:
ROBERT PIERRE LEROY Dec. 7, 1954  R. P. LEROY  2,696,591
LATTICE-TYPE REACTIVE QUADRIPOLES
Filed Dec. 20, 1951  5 Sheets-Sheet 4

$(m'+m''=m+n_2)$  $(n'+n''=m+n)$

INVENTOR:
ROBERT PIERRE LEROY
BY:

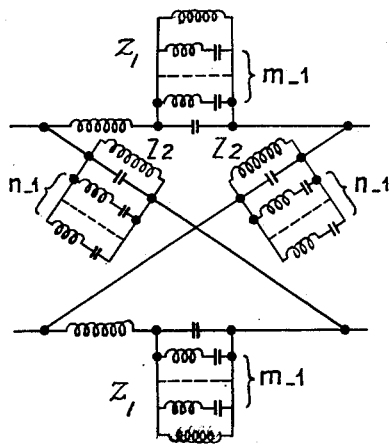
*Fig. 5*
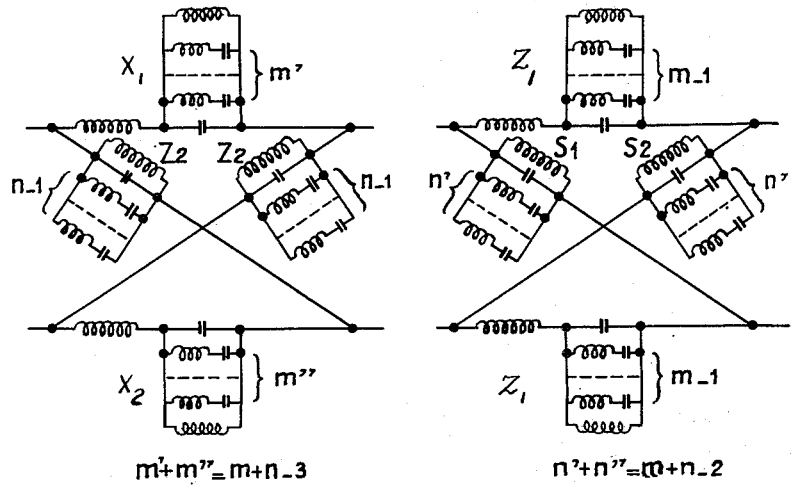
$m'+m''=m+n-3$
*Fig. 5'*
$n'+n''=m+n-2$
*Fig. 5''*
INVENTOR:
ROBERT PIERRE LEROY
BY:

United States Patent Office 2,696,591
Patented Dec. 7, 1954

2,696,591

LATTICE-TYPE REACTIVE QUADRIPOLES

Robert Pierre Leroy, Paris, France, assignor to Compagnie Industrielle des Téléphones, Paris, France, a French corporation Application December 20, 1951, Serial No. 262,599

Claims priority, application France December 28, 1950

4 Claims. (Cl. 333—74)

In French Patent No. 949,926, filed on August 23, 1945, applicant showed how, by using lattice type networks with three separate reactances, it is possible to obtain filters equivalent to the classic filters with a single pass band (band-pass, low-pass, high-pass).

The object of the present invention is the application of the same method to more general types of filters, independent of the research on filters comprising several pass-bands, this class of filter has to be considered if it be desired to eliminate from a standard type of filter-section identical impedances which are in series or in shunt in each of the branches of the filter-section, by employing a method employed by Mason, for example in his work "Electromechanical Transducers and Wave Filters."

The transformed filter-section is not usually a single-pass-band filter section when such is the case of the original section.

The separate transformation of the filter-section therefore requires the extension of the method employed in the above-mentioned patent.

In the following it is assumed that $z_1$ and $z_2$ have neither zeros nor poles in common—except in certain cases for zero or infinite frequencies—that is to say that the impedance function has no critical points outside the branching points. This restriction is not essential, as has been shown in the above-mentioned French patent (page 15, lines 11 et seq.).

Let us first of all assume a conventional lattice type network which does not pass either the zero frequency or the infinite frequency.

It may be assumed that the branches $z_1$ and $z_2$ allow a zero at the origin, because, if this were not so, we should be brought back to this case by taking the filter-section of inverse branches, $$z'_1 = \frac{1}{z_1}$$

$$z'_2 = \frac{1}{z_2}$$

At infinity, $z_1$ and $z_2$ simultaneously offer a zero or a pole. We will assume that they do not offer them simultaneously anywhere else.

Therefore these two cases have to be considered:

Case 1  $\quad z_1 = A_1 p \dfrac{P_{m-1}}{Q_m} \quad\quad z_2 = A_2 p \dfrac{R_{n-1}}{S_n}$ Case 2  $\quad z_1 = A_1 p \dfrac{P_m}{Q_m} \quad\quad z_2 = A_2 p \dfrac{R_n}{S_n}$ The method of determination of the filter-network according to the invention is based, as in the above-mentioned patent, on the research on solutions by reactances $x_1$, $x_2$ of the equation:

(A) $\quad\quad \dfrac{1}{x_1 + z_2} + \dfrac{1}{x_2 + z_2} = \dfrac{2}{z_1 + z_2}$ if it be desired to substitute the branches $x_1$, $x_2$ for the equal branches $z_1$, or of the equation:

(A') $\quad\quad \dfrac{1}{S_1 + z_1} + \dfrac{1}{S_2 + z_1} = \dfrac{2}{z_1 + z_2}$ if it be desired to substitute for the equal branches $z_2$ the branches $S_1$, $S_2$.

CASE I

We assume that $m \geq n$.
We have:

(1) $\quad z_1 + z_2 = p \dfrac{A_1 P_{m-1} S_n + A_2 R_{n-1} Q_m}{Q_m S_n}$ hence, in seeking to replace $z_1$:

(2) $\quad \dfrac{1}{x_1 + z_2} = \dfrac{S_n(Q_m + k^2 \theta_{m-n} S_n)}{p(A_1 P_{m-1} S_n + A_2 R_{n-1} Q_m)}$ $\quad \dfrac{1}{x_2 + z_2} = \dfrac{S_n(Q_m - k^2 \theta_{m-n} S_n)}{p(A_1 P_{m-1} S_n + A_2 R_{n-1} Q_m)}$ $\theta_{m-n}$ being a polynomial in $p^2$ of which the coefficient of highest power is equal to 1 and of degree $m-n$ at most.

This form is necessary in order that $\overline{x_1 + z_2}$ and $\overline{x_2 + z_2}$ admit for the poles of $z_2$ the same remainders as $z_2$ or $z_1 + z_2$. The condition $m - n \geq 0$ is therefore necessary; the branch of lowest degree cannot be replaced.

We have $\underline{m - n + 1}$ parameters available to reduce the degree of $x_1 + z_2$ or $x_2 + z_2$, by causing common factors on the numerator and on the denominator to disappear by a suitable choice of $k^2 \theta_{m-n}$; in the most favourable case, we can expect a reduction of $(m - n + 1)$ resonant circuits. However, it is obviously necessary for $x_1$ and $x_2$ to retain their character of reactances.

If we put:

(3) $\quad\quad n = m - s \, (0 \leq s \leq m - 1)$ and (4) $\quad \begin{cases} P_{m-1} = P_{m-1-\mu} U_\mu & S_n = S_{n-\mu} U_\mu \\ Q_m = Q_{m-\nu} V_\nu & R_{n-1} = R_{n-1-\nu} V_\nu \end{cases}$ we get:

$z_1 + z_2 = p \dfrac{A_1 P_{m-1-\mu} S_{n-\mu} U_\mu^2 + A_2 R_{n-1-\nu} Q_{m-\nu} V_\nu^2}{Q_{m-\nu} S_{n-\mu} U_\mu V_\nu}$ (5)

$\quad = p \dfrac{W_{m+n-1}(p^2)}{Q_{m-\nu} S_{n-\mu} U_\mu V_\nu}$ hence (6) $\begin{cases} \dfrac{1}{x_1 + z_2} = \dfrac{S_{n-\mu} U_\mu (Q_{m-\nu} V_\nu + k^2 \theta_s S_{n-\mu} U_\mu)}{p(W_{m+n-1}(p^2))} \\ \dfrac{1}{x_2 + z_2} = \dfrac{S_{n-\mu} U_\mu (Q_{m-\nu} V_\nu - k^2 \theta_s S_{n-\mu} U_\mu)}{p(W_{m+n-1}(p^2))} \end{cases}$ and consequently:

(7) $\begin{cases} x_1 = p \dfrac{A_1 P_{m-1-\mu} U_\mu - k^2 A_2 \theta_s R_{n-\nu-1} V_\nu}{Q_{m-\nu} V_\nu + k^2 \theta_s S_{n-\mu} U_\mu} \\ x_2 = p \dfrac{A_1 P_{m-1-\mu} U_\mu + k^2 A_2 \theta_s R_{n-\nu-1} V_\nu}{Q_{m-\nu} V_\nu - k^2 \theta_s S_{n-\mu} U_\mu} \end{cases}$ The boundaries of the $\beta$ pass bands are the frequencies cancelling:

$\quad P_{m-1-\mu} \quad Q_{m-\nu} \quad S_{n-\mu} \quad R_{n-1-\nu}$

Their number is: $2m + 2n - 2\mu - 2\nu - 2 = 2\beta$ and the reductions of degree possible on $x_1$ and on $x_2$ by a suitable choice of $k^2 \theta_s$ causing the appearance of one or more common factors on the numerator and denominator of $x_1$ and $x_2$, are obtained when:

(8) $\quad \phi(p^2) = k^4 A_2 \theta_s^2 R_{n-\nu-1} S_{n-\mu} + A_1 P_{m-1-\mu} Q_{m-\nu} = 0$ allows roots of $W_{m+n-1}(p^2) = 0$ $\phi(p^2)$ is of degree $2m - \mu - \nu - 1 = \beta + s$ in $p^2 (\beta \geq s)$ As we have $(s + 1)$ parameters, we will try to express that the equation $\phi(p^2) = 0$, of degree $\beta + s$ in $p^2$ admits $s + 1$ of the $\underline{m + n - 1}$ roots of $W_{m+n-1}(p^2) = 0$.

If $k^2 \theta_s$ has been thus determined, the degrees of $x_1$ and $x_2$ will in total be reduced by $(s + 1)$ and if $x_1$ and $x_2$ again represent reactances, we obtain a gain of $(s + 1)$ of the resonant circuits.

Whatever the polynomial $\theta_s(p^2)$, $\phi(p^2)$ admits for $k^2 = 0$ the zeros of $P_{m-1-\mu} Q_{m-\nu}$ and, when $k^2$ increases the roots of $\phi(p^2)$ are displaced inside the pass-bands, where the following condition is fulfilled:

$$P_{m-1-\mu}Q_{m-\nu}\ S_{n-\nu}\ R_{n-1-\nu} < 0$$

The roots of $\phi(p^2)$ are therefore shifted towards the zeros of $W_{m+n-1}(p^2)$ which are the nearest of the zeros of $P_{m-1-\mu}Q_{m-\nu}$, and in the pass-bands of which these zeros define a boundary. If each band contains at least two zeros of $W_{m+n+1}(p^2)$ it is certain that each of the $\beta+s$ zeros of $\phi(p^2)$ is shifted towards a different root; if $\theta_s$ be chosen in such a way that, by causing $k^2$ to increase, $\phi(p^2)$ admits for a value $k^2{}_m$ simultaneously $s+1$ of the $\beta+s$ zeros of $W_{m+n-1}(p^2)$, the values of $x_1+z_2$ and $x_2+z_2$ given by the Formulae 6 will always represent reactances, if none of the roots of the numerators is passed for $0 < k^2 < k_m{}^2$ by zero or infinite values, that is to say, if $k_m{}^2$ be less than $$k_0{}^2 = \left(\frac{Q_{m-\nu}V_\nu}{S_{n-\mu}U_\mu\theta}\right)_0$$

and than $k_0{}^2 = 1$.

The same applies, under these conditions to $x_1$ and $x_2$, which show the pecularities of $z_2$ with the same remainders.

In the case under consideration, a choice has to be made from the $\beta+s$ possible roots; thus we should have a priori $$C^{s+1}_{\beta+s}$$

tests; this number can be reduced in the case of pass bands of which the boundaries are respectively zeros of $P_{m-1+\mu}$ and $Q_{m-\nu}$, and only contain a zero of $W_{m+n-1}$; in this case a single zero of $W_{m+n-1}$ may be eliminated by two roots of $\phi(p^2)$; the number of such bands is obviously at most equal to the smallest of the numbers $m-1-\mu$, $m-\nu$; the reduction of the zeros of $W_{m+n-1}$ to be considered is therefore $m-1-\mu$ at most; there remain therefore at least $$\beta+s-(m-1-\mu)=2m-\mu-\nu-1-$$
$$m+1+\mu = m-\nu \geqslant m-n+1 \geqslant s+1$$

Generally speaking we shall designate by $s+s'$ the number of zeros of $W_{m+n-1}$ which can be used a priori: $1 \leqslant s' \leqslant \beta$.

We will designate by $$-\sigma_1{}^2 - \sigma_2{}^2 \ldots -\sigma_h{}^2 \ldots -\sigma_{s+1}{}^2$$

one of the sets of zeros of $W_{m+n+1}$ with which we are seeking to merge $s+1$ of the zeros of $\phi(p^2)$; we will put (9) $\quad \eta_h{}^{4s} = -\dfrac{A_1}{A_2}\left(\dfrac{P_{m-1-\mu}Q_{m-\nu}}{R_{n-\nu-1}S_{n-\mu}}\right)_{p^2=-\sigma_h{}^2}$ $k_m{}^2\theta_s$ will be determined by the Lagrange formula:

(10) $\quad k_m{}^2\theta_s = \sum\limits_{h=1}^{s+1} \epsilon_h \eta^{2s} \dfrac{G(p^2)}{(p^2+\sigma_h{}^2)\left(\dfrac{dG}{dp^2}\right)_{p^2=-\sigma_h{}^2}}$ hence

(11) $\quad G(p^2) = \prod\limits_{h=1}^{s+1}(p^2+\sigma_h{}^2) \ldots$

In order that this formal solution may apply, it is first of all necessary that for the other zeros of $$W_{m+n-1}(p^2) - \sigma_{s+2}{}^2, -\sigma_{s+k}{}^2, -\sigma_{s+s'}{}^2$$

with which the zeros of $\phi(p^2)$ might be merged we should have:

(12) $\quad k_m{}^2|\theta_s(\sigma_{s+k}{}^2) \leqslant \eta_{s+k}{}^{2s}$ condition of alternation.

In other words, if we consider the curve $$k_m{}^2\theta_s$$

which passes through the points $$(-\sigma_h{}^2,\ \epsilon_h\eta_h{}^{2s})$$

for $h=1, 2, \ldots s+1$ as well as its symmetrical in relation to the axis of the frequencies, these curves should not contain inside them any of the other points $$(-\sigma_{s+k}{}^2 \epsilon_{s+k}\eta_{s+k}{}^{2s})$$

for $k=2, \ldots s'-s$.

If, moreover:

(13) $\quad \left|k_m{}^2 = \sum\limits_{h=1}^{s+1} \dfrac{\epsilon_h\eta_h{}^{2s}}{(\sigma_1{}^2-\sigma_h{}^2) \ldots (\sigma_{h-1}{}^2-\sigma_h{}^2)(\sigma_{h+1}{}^2-\sigma_h{}^2) \ldots (\sigma_{s+1}{}^2-\sigma_h{}^2)}\right| < 1$ and

(14) $\quad \left|k_m{}^2\theta_s\right|_0 = \left|\sum\limits_{h=1}^{s+1}\epsilon_h\eta_{hs}{}^{2s}\dfrac{\sigma_1{}^2 \ldots \sigma_{s+1}{}^2}{\sigma_h{}^2\Pi'(\sigma_i{}^2-\sigma_h{}^2)}\right| < \left(\dfrac{Q_m}{S_n}\right)_0$ we shall obtain by the Formulae 6 the limbs of a filter network showing a gain of $(s+1)$ circuits over the conventional filter-section, which gain is obtained on the one branch or the other according to the sign of the corresponding $\epsilon$.

It will be seen that generally speaking, $z_1$ can be obtained by putting in shunt a capacity, an inductance and $m-1$ resonant circuits; $z_2$ can be obtained by putting in shunt a capacity, an inductance and $(n-1)$ resonant circuits (Fig. 1).

$x_1$ and $x_2$ may be represented by a diagram of the same type with $m'$ and $m''$ resonant circuits (Fig. 1') in such a way that $$m'+m'' = 2(m-1)-(s+1) = m+n-3$$

determining $x_1$ and $x_2$ by the Formulae 6 and 10 under the Conditions 12, 13, 14.

A gain of $(s+1)$ resonant circuits or of $(s+1)$ quartz can thus be obtained with respect to the conventional filter-section if the above conditions are fulfilled.

A simple case is that in which $s=m-n=1$; the polynomials $k^2\theta_s$ then represent the straight lines as a function of $p^2$, and it is certain that by taking the $\epsilon$ of the same sign—positive since $\theta_s$ is defined to the nearest sign—it is possible to choose—in one way at least—the two zeros of $W_{m+n}$ so as to fulfill the Conditions 12.

Then we only have to verify 13 and 14 which become, the zeros being designated by $-\sigma_1{}^2$ and $-\sigma_2{}^2$:

(13') $\quad \left|\dfrac{\eta_1{}^2-\eta_2{}^2}{\sigma_1{}^2-\sigma_2{}^2}\right| < 1$ (14') $\quad \left|\dfrac{\eta_1{}^2\sigma_2{}^2-\eta_2{}^2\sigma_1{}^2}{\sigma_1{}^2-\sigma_2{}^2}\right| < \left(\dfrac{Q_m}{S_{m-1}}\right)_0$ More precisely, if we consider the points $A_1, A_2 \ldots A_{s+1}$ of co-ordinates $$(-\sigma_j{}^2,\ \eta_j{}^2)\ (1 \leqslant j \leqslant 1+s',\ \sigma_1{}^2 < \sigma_2{}^2 \ldots < \sigma_1{}^2+s')$$

we shall select from them those which determine a convex broken line leaving all the other points on the side opposite to the axis of the $p^2$, and we shall retain among the segments of this line those of which the slope is lower in absolute value than 1 (13') and the ordinate at the origin less than $$\left(\dfrac{Q_m}{S_{m-1}}\right)_0$$

(14') in absolute value.

There are physically acceptable solutions corresponding to them which permit a gain of two resonant circuits.

CASE II

We then have:

(15) $\quad z_1+z_2 = p\dfrac{A_1P_mS_n+A_2R_nQ_m}{Q_mS_n} = p\dfrac{W_{m+n}(p^2)}{Q_mS_n}$ By putting:

$$n=m-s$$

(16) $\quad \begin{cases} P_m = P_{m-\mu}U_\mu, & S_n = S_{n-\mu}U_\mu \\ Q_m = Q_{m-\nu}V_\nu, & R_n = R_{n-\nu}V_\nu \end{cases}$ we get:

(17)
$$\frac{1}{x_1+z_2}=\frac{S_{n-\mu}U_\mu(Q_{m-\nu}V_\nu+k^2\theta_s S_{n-\mu}U_\mu)}{pW_{m+n}(p^2)}$$

$$\frac{1}{x_2+z_2}=\frac{S_{n-\mu}U_\mu(Q_{m-\nu}V_\nu-k^2\theta_s S_{n-\mu}U_\mu)}{pW_{m+n}(p^2)}$$

in which $\theta_s$ has the same significance as in the Case 1 and consequently:

(18)
$$x_1=p\frac{A_1P_{m-\mu}U_\mu-k^2A_2\theta_s R_{n-\nu}V_\nu}{Q_{m-\nu}V_\nu+k^2\theta_s S_{n-\mu}U_\mu}$$

$$x_2=p\frac{A_1P_{m-\mu}U_\mu+k^2A_2\theta_s R_{n-\nu}V_\nu}{Q_{m-\nu}V_\nu-k^2\theta_s S_{n-\mu}U_\mu}$$

Here, the number $\beta$ of pass bands is given by:

(19) $\qquad \beta=m+n-\mu-\nu$

The factors of reduction for $x_1$ and $x_2$ are obtained when:

(20) $\phi(p^2)=k^4A_2\theta_s^2 R_{n-\nu}S_{n-\mu}+A_1P_{m-\mu}Q_{m-\nu}=0$ admits roots of $W_{m+n}(p^2)=0$.

The $\beta+s$ zeros of $\phi$, given by $P_{m-\mu}Q_{m-\nu}$ for $k^2=0$, penetrate into the pass bands when $k^2$ increases as it approaches the zeros nearest to $W_{m+n}(p^2)$.

The number of zeros of $W_{m+n}$ is comprised between $\beta+s$ and the largest of the numbers $m-\mu$, $m-\nu$, in the circumstances similar to those encountered in Case 1.

If $\mu=\nu=n$, it would seem that the minimum is reduced to $s$. In this case:

$$z_1=\frac{A_1 p P_{m-n} S_n}{Q_{m-n} R_n}, \quad z_2=A_2 p\frac{R_n}{S_n}$$

The pass bands are $m-n$ in number and must contain $m+n$ zeros; one at least of these bands therefore contains several of them, so that the lower limit is $\underline{s+1}$ and not $s$.

As in the previous case, we have to choose between $s+s'$ roots with $1 \leq s' \leq \beta$.

Putting:

(21) $\qquad \eta_h^{4s}=-\frac{A_1}{A_2}\left(\frac{P_{m-\mu}Q_{m-\nu}}{R_{n-\nu}S_{n-\nu}}\right)_{p^2=-\sigma_h^2}$ we determine $k_m^2\theta_s$ by:

(22) $\qquad k_m^2\theta_s=\sum_{h=1}^{s+1}\epsilon_h\eta_h^{2s}\frac{G(p^2)}{(p^2+\sigma_h^2)\left(\frac{dG}{dp^2}\right)_{p^2=-\sigma_h^2}}$ $G(p^2)$ being defined by:

(23) $\qquad (G(p^2)=\prod_{h=1}^{s+1}(p^2+\sigma_h^2)$

The $\sigma_h$ must be chosen in such a way that

(24) $k_m^2|\theta_s(-\sigma_{s+k}^2)| \leq \eta_{s+k}^{2}$ $k=2, 3 \ldots s'-s$ and that furthermore:

(25) $\qquad k_m^2 < 1$

(26) $\qquad |k_m^2\theta_s|0 < \left(\frac{Q_n}{S_n}\right)_0$

These conditions ensure that the expressions appearing in the left hand sides of (17) represent reactances; the same applies to their inverse functions; in order that it may be the same for $x_1$ and $x_2$ it is necessary and it is sufficient that their remainders to infinity be positive, that is to say that, in addition to (25) we have:

(27) $\qquad k_m^2 < \frac{A_1}{A_2}$

Figure 2:
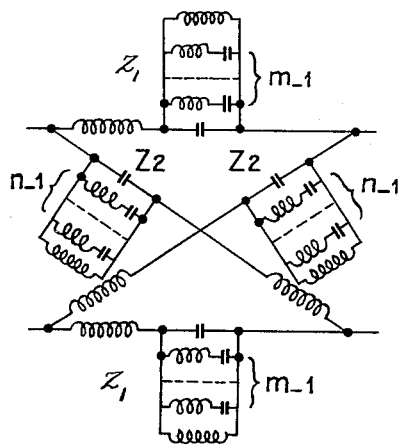
Figure 2:
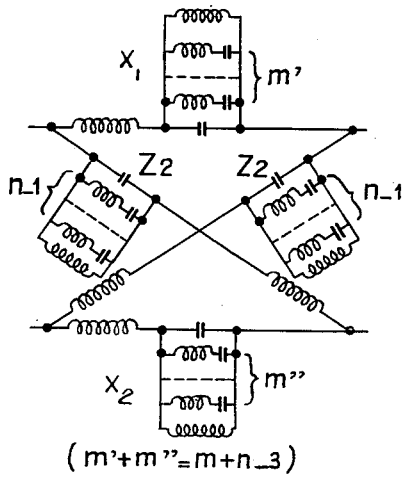

Under these conditions, $z_1$ and $z_2$ being obtainable by putting an inductance in series with the grouping in parallel of a capacity, an inductance, and of $m-1$ or $n-1$ resonant circuits (Fig. 2) the reactances $x_1$ and $x_2$, which may be substituted for the two branches $z_1$ allow the same type of structure with $m'$ and $m''$ resonant circuits, $m'+m''$ being equal to $2(m-1)-(s+1)=m+n-3$ (Fig. 2').

When $s=1$, remarks similar to those of Case 1 can be made.

It remains to consider the filter-sections which allow one or the other to pass, or one or the other of the zero and infinite frequencies.

In the second hypothesis, it is sufficient to deal with the case of the infinite frequency, as the case of the zero frequency can be inferred therefrom by substituting $$\frac{1}{p} \text{ for } p$$

I. *Filter-sections allowing the zero and infinite frequencies to pass*

It can be assumed that the branch $z_1$ has zeros at the origin according to their behaviour at infinity we have the Cases $1\alpha$ and $1\beta$:

$I\alpha \qquad z_1=A_1 p\frac{P_m}{Q_{m+1}} \qquad z_2=\frac{A_2}{p}\frac{R_{n+1}}{S_n}$ $I\beta \qquad z_1=A_1 p\frac{P_m}{Q_m} \qquad z_2=\frac{A_2}{p}\frac{R_n}{S_n}$ CASE $I\alpha$ We have:

(28) $\qquad \frac{1}{z_1+z_2}=\frac{pS_nQ_{m+1}}{A_1p^2P_mS_n+A_2R_{n+1}Q_{m+1}}=\frac{pS_nQ_{m+1}}{W_{m+n2}(p^2)}$ REPLACEMENT OF $z_1$ The replacement of $z_1$ gives the relations:

(29)
$$\frac{1}{x_1+z_2}=\frac{pS_n(Q_{m+1}+k^2p^2S_n\theta_{s-1})}{W_{m+n+2}}$$

$$\frac{1}{x_2+z_2}=\frac{pS_n(Q_{m+1}-k^2p^2S_n\theta_{s-1})}{W_{m+n+2}}$$

the form necessary in order that the remainders of $x_1+z_2$, $x_2+z_2$ may also be acceptable, for $p=0$, $p=\infty$, hence:

(30)
$$\begin{cases} x_1=p\frac{A_1P_m-k^2A_2R_{n+1}\theta_{s-1}}{Q_{m+1}+k^2p^2S_n\theta_{s-1}} \\ x_2=p\frac{A_1P_m+k^2A_2R_{n+1}\theta_{s-1}}{Q_{m+1}-k^2p^2S_n\theta_{s-1}} \end{cases}$$

It is again sufficient, according to the foregoing, for $x_1+z_2$, $x_2+z_2$ to be reactances in order that the same may apply for $x_1$ and $x_2$. We are again lead to write:

(31) $\begin{cases} P_m=P_{m-\mu}U_\mu, \quad R_{n+1}=R_{n+1-\nu}V_\nu \\ Q_{m+1}=Q_{m+1-\nu}V_\nu, \quad S_n=S_{n-\mu}U_\mu \end{cases}$ which gives

(32) $\begin{cases} x_1=p\dfrac{A_1P_{m-\mu}U_\mu-k^2A_2R_{n+1-\nu}V_\nu\theta_{s-1}}{Q_{m+1-\nu}V_\nu+k^2p^2S_{n-\mu}U_\mu\theta_{s-1}} \\ x_2=p\dfrac{A_1P_{m-\mu}U_\mu+k^2A_2R_{n+1-\nu}V_\nu\theta_{s-1}}{Q_{m+1-\nu}V_\nu-k^2p^2S_{n-\mu}U_\mu\theta_{s-1}} \end{cases}$ and to introduce:

(33) $\phi(p^2)=A_1P_{m-\mu}Q_{m+1-\nu}+k^4A_2p^2R_{n+1-\nu}S_{n-\mu}\theta_{s-1}^2$ The reduction of degree will be obtained by determining $k_m^2\theta_{s-1}$ so as to cause $s$ zeros of $\phi$ to coincide with $s$ zeros of $W_{m+n+2}$, selected from $s+s'$ ($s' \leq \beta$) provided that, $\theta_{s-1}$ being fixed, no coincidence occurs for a value of $k^2$ lower than $k_m^2$ (conditions of alternation).

We put:

(34) $\eta_h^{4s-4}=-\dfrac{A_1}{A_2}\left[\dfrac{P_{m-\mu}Q_{m+1-\nu}}{p^2(R_{n+1-\nu}S_{n-\mu})}\right]_{p^2=-\sigma_h^2}$ $(h=1,2 \ldots s)$ and obtain from it:

(35) $k_m^2\theta_{s-1}=\sum_{h=1}^{s}\epsilon_h\eta^{2s-2}\dfrac{G(p^2)}{(p^2+\sigma_h^2)\left(\dfrac{dG}{dp^2}\right)_{p^2=-\sigma_h^2}}$ $$G(p^2)=\prod_{p=1}^{s}(p^2+\sigma_h^2)$$

the conditions of alternation:

(36) $\quad k_m^2|\theta_{s-1}(-\sigma_{s+k}^2)| \leq \eta_{s+k}^{2s-2}$ $(k=1, 2 \ldots s')$ being sufficient, since, according to their form, the numerators of the right hand sides of (29) cannot take zero or infinite roots.

Here (Fig. 3), $z_1$ is composed of the putting in parallel of an inductance, a capacity and $m$ resonant circuits; $z_2$ being formed by the placing in series with an inductance of the grouping in parallel of $n$ resonant circuits and a capacity.

The branches $x_1$ and $x_2$ substituted for the branches $z_1$ are similar in structure to that of $z_1$ with respectively $m'$ and $m''$ resonant circuits, $m' + m''$ being equal to $2m-s=m+n$ (Fig. 3').

REPLACEMENT OF $z_2$

We have:

(37) $\begin{cases} \dfrac{1}{s_1+z_1} = \dfrac{pQ_{m+1}(S_n+k^2Q_{m+1}\theta_{n-m-1})}{W_{m+n+2}(p^2)} \\ \dfrac{1}{s_2+z_1} = \dfrac{pQ_{m+1}(S_n-k^2Q_{m+1}\theta_{n-m-1})}{W_{m+n+2}(p^2)} \end{cases}$ hence:

(38) $\begin{cases} s_1 = \dfrac{A_2R_{n+1}-k^2A_1p^2P_m\theta_{n-m-1}}{p(S_n+k^2Q_{m+1}\theta_{n-m-1})} \\ s_2 = \dfrac{A_2R_{n+1}+k^2A_1p^2P_m\theta_{n-m-1}}{p(S_n-k^2Q_{m+1}\theta_{n-m-1})} \end{cases}$ $s_1+z_1$, $s_2+z_1$ admit, according to (37) all the poles of $z_1$ with their remainders; $s_1$ and $s_2$ are therefore both reactances and the right hand sides of the relations (37) at the same time.

It is necessary to consider here:

(39) $\phi(p^2) = k^4A_1p^2\theta_{n-m-1}^2 P_{m-\mu}Q_{m+1-\nu} + A_2R_{n+1-\nu}S_{n-\nu}$ and proceed as before.

In addition to conditions of alternation it is necessary here that:

$k_m^2 < 1, |k_m^2 \theta_{n-m-1}|_0 < \left(\dfrac{S_n}{Q_{m+1}}\right)_0$ $s_1$ and $s_2$ then have the same type of structure as $z_2$ with $n'$ and $n''$ resonant circuits, $n'+n''$ being equal to $m+n$ (Fig. 3'').

In brief, if $|m-n| \geq 1$, gain of $|m-n|$ resonant circuits by replacement of the branches of the highest degree.

Figure 4:
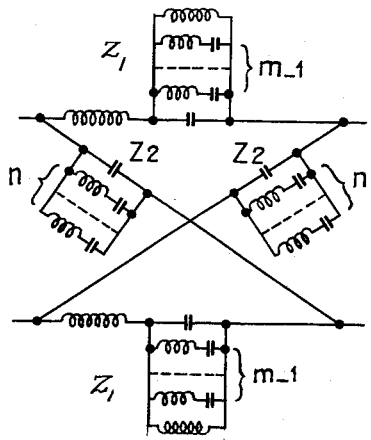
Figure 4:
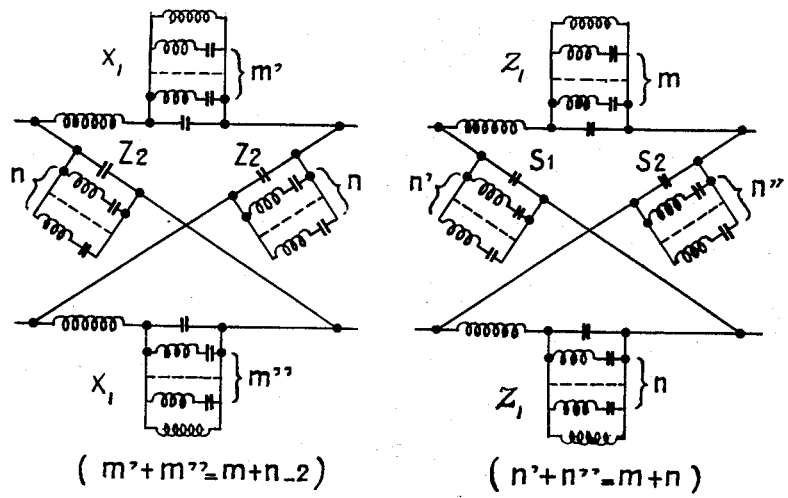

CASE I$\beta$ $z_1$ can be obtained by placing an inductance in series with the grouping in parallel of a capacity, an inductance, and of $(m-1)$ resonant circuits; $z_2$ can be obtained by placing in parallel $n$ resonant circuits and a capacity (Fig. 4).

REPLACEMENT OF $z_1$

We find:

(40) $\begin{cases} \dfrac{1}{x_1+z_2} = \dfrac{pS_n(Q_m+k^2p^2S_n\theta_{s-1})}{W_{m+n+1}(p^2)} \\ \dfrac{1}{x_2+z_2} = \dfrac{pS_n(Q_m-k^2p^2S_n\theta_{s-1})}{W_{m+n+1}(p^2)} \end{cases}$ by putting:

$W_{m+n+1}(p^2) = A_1p^2P_mS_n + A_2R_nQ_m$

It will be seen that, by proceeding as before, if we fulfil the conditions of alternation as well as $k_m^2 < 1$, we obtain, on $x_1$ and $x_2$, a total gain of $s$ resonant circuits in relation to the branches $z_1$. The number of resonant circuits in $x_1$ and $x_2$ is in all:

$m'+m''=m+n-2$ (Fig. 4')

REPLACEMENT OF $z_2$

We find:

(41) $\begin{cases} \dfrac{1}{s_1+z_1} = \dfrac{pQ_m(S_n+k^2Q_m\theta_{n-m-1})}{W_{m+n+1}(p^2)} \\ \dfrac{1}{s_2+z_1} = \dfrac{pQ_m(S_n-k^2Q_m\theta_{n-m-1})}{W_{m+n+1}(p^2)} \end{cases}$ If we can satisfy, in addition to the conditions of alternation:

$|k_m^2\theta_{n-m-1}|_0 < \left(\dfrac{S_n}{Q_m}\right)_0$ we can obtain on $s_1$ and $s_2$ a gain of $(n-m)$ resonant circuits in relation to the branches $z_2$. They have the same type of structure as $z_2$ with $m+n$ resonant circuits in all (Fig. 4'').

II. *Filter-sections allowing the infinite frequency to pass and not the zero frequency*

It can be assumed that $z_1$ and $z_2$ allows zeros at the origin: the one will admit a pole at infinity, the other a zero. We can then put:

$z_1 = A_1p\dfrac{P_m}{Q_m}$ $z_2 = A_2p\dfrac{R_{n-1}}{S_n}$ $z_1$ can be obtained by putting an inductance in series with the grouping in parallel of a capacity, an inductance and of $m-1$ resonant circuits, $z_2$ can be obtained by placing in parallel an inductance, a capacity and $(n-1)$ resonant circuits (Fig. 5).

REPLACEMENT OF $z_1$

We find:

(42) $\begin{cases} \dfrac{1}{x_1+z_2} = \dfrac{S_n[Q_m+k^2S_n\theta_s]}{pW_{m+n}(p^2)} \\ \dfrac{1}{x_1+z_2} = \dfrac{S_n[Q_m-k^2S_n\theta_s]}{pW_{m+n}(p^2)} \end{cases}$ $x_1$ and $x_2$ given by:

(43) $\begin{cases} x_1 = p\dfrac{A_1P_m-k^2A_2R_{n-1}\theta_s}{Q_m+k^2S_n\theta_s} \\ x_2 = p\dfrac{A_1P_m+k^2A_2R_{n-1}\theta_s}{Q_m-k^2S_n\theta_s} \end{cases}$ $x_1$ and $x_2$ have the type of structure of $z_1$, but with $m'$ and $m''$ resonant circuits (Fig. 5')

$(m'+m''=m+n-3)$ $k_m^2\theta_s$ being determined by the same method as before.

Necessary and sufficient conditions: of alternation, $k_m^2 < 1, |k_m^2\theta_s|_0 < \left(\dfrac{Q_m}{S_n}\right)_0$ REPLACEMENT OF $z_2$ In this case we have:

(44) $\begin{cases} \dfrac{1}{s_1+z_1} = \dfrac{Q_m[S_n+k^2Q_m\theta_{n-m-1}]}{pW_{m+n}(p^2)} \\ \dfrac{1}{s_2+z_1} = \dfrac{Q_m[S_n-k^2Q_m\theta_{n-m-1}]}{pW_{m+n}(p^2)} \end{cases}$ $s_1$ and $s_2$ given by:

(45) $\begin{cases} s_1 = p\dfrac{A_2R_{n-1}-k^2A_1P_m\theta_{n-m-1}}{S_n+k^2Q_m\theta_{n-m-1}} \\ s_2 = p\dfrac{A_2R_{n-1}+k^2A_1P_m\theta_{n-m-1}}{S_n+k^2Q_m\theta_{n-m-1}} \end{cases}$ of the same type of structure as $z_2$, having $n'$ and $n''$ resonant circuits $(n'+n''=m+n-2)$ (Fig. 5''), for a suitable choice of $k_m^2\theta_{n-m-1}$.

Necessary and sufficient conditions of alternation:

$k_m^2|\theta_{n-m-1}|_0 < \left(\dfrac{S_n}{Q_m}\right)_0$

What is claimed is:
1. A lattice-type, electrically symmetrical reactive four-terminal network comprising a number $\beta$ of pass bands excluding zero and infinite frequencies, said network being equivalent to a band-pass filter with two sets of opposite and identical branches consisting, respectively, of reactances $z_1$ and $z_2$ given by the expressions $$z_1 = \frac{A_1 p P_{m'}}{Q_m} = \frac{A_1 p P_{m'-\mu} U_\mu}{Q_{m-\nu} V_\nu}$$

$$z_2 = \frac{A_2 p R_{n'}}{S_n} = \frac{A_2 p R_{n'-\nu} V_\nu}{S_{n-\mu} U_\mu}$$

wherein $A_1$ and $A_2$ are constants, and $p$ designates the quantity $2\pi j f$, $f$ representing the operating frequency, P, Q. R, S, U and V are polynomials in terms of $p^2$, and $m$, $m'$, $n$, $n'$, $\mu$ and $\nu$ are integral parameters, the differences $m-m'$ and $n-n'$ being equal to each other and capable of assuming either of the values 0 and 1 but no other, $n$ having a value between 1 and $m$ inclusive, said network being characterized by the fact that it comprises a set of two opposite branches equal to $z_2$ and a set of two opposite, unequal branches $x_1$ and $x_2$ given by the expressions $$x_1 = p \frac{A_1 P_{m'} - k_m^2 A_2 \theta_s(p^2) R_{n'}}{Q_m + k_m^2 \theta_s(p^2) S_n}$$

and $$x_2 = p \frac{A_1 P_{m'} + k_m^2 A_2 \theta_s(p^2) R_{n'}}{Q_m - k_m^2 \theta_s(p^2) S_n}$$

$s$ being equal to $m-n$, and $$k_m^2 \theta_s(p^2)$$

being a polynomial of the order $s$ in terms of $p^2$ whose highest-order term has the coefficient $$k_m^2$$

and which is defined by the equation $$k_m \theta_s(p^2) = \sum_{h=1}^{s+1} \epsilon_h \eta_h^{2s} \left[ \frac{G(p^2)}{(p^2 + h^2)} \frac{dG}{dp^2} \right]_{p^2 = -\sigma_h^2}$$

wherein $\epsilon_h = \pm 1$ and wherein $-\sigma_1^2, -\sigma_2^2, \ldots -\sigma_{s+1}^2$ represent $s+1$ zeros of $z_1+z_2$ selected from a maximum number of $s+\beta$ thereof, and wherein further $G(p^2)$ is equal to the product $$\prod_{h=1}^{s+1} (p^2 + \sigma_h^2)$$

and the values of $$\eta_h^{2s}$$

are given by $$\eta_h^{4s} = -\frac{A_1}{A_2} \left[ \frac{P_{m'-\mu} Q_{m-\nu}}{R_{n'-\nu} S_{n\mu}} \right]_{p^2 = -\sigma_h^2}$$

the branches $x_1$ and $x_2$ being realizable by means of a number of resonant circuits falling short by $s+1$ of the number of such circuits in the identical and opposite branches $z_1$ of said equivalent filter.

2. A lattice-type, electrically symmetrical reactive four-terminal network comprising a number $\beta$ of pass bands including zero and infinite frequencies, said network being equivalent to a band-pass filter with two sets of opposite and identical branches consisting, respectively, of reactances $z_1$ and $z_2$ given by the expressions $$z_1 = A_1 p \frac{P_m}{Q_{m+1}} = \frac{A_1 p P_{m-\mu} U_\mu}{Q_{m+1-\nu} V_\nu}$$

and $$z_2 = \frac{A_2}{p} \frac{R_{n+1}}{S_n} = \frac{A_2 R_{n+1-\nu} V_\nu}{p S_{n-\mu} U_\mu}$$

wherein $A_1$ and $A_2$ are constants, $p$ designates the quantity $2\pi j f$, $f$ representing the operating frequency, P, Q, R, S, U, and V are polynomials in terms of $p^2$, and $m$, $n$, $\mu$ and $\nu$ are integral parameters, said network comprising a first pair of identical and opposite branches as well as a second pair of unequal and opposite branches having the following characteristics: (a) if $m-n=s\geq 1$, the branches of said first pair are equal to $z_2$ and the branches $x_1$, $x_2$ of said second pair are given by the expressions $$x_1 = p \frac{A_1 P_m - k_m^2 A_2 R_{n+1} \theta_{s-1}(p^2)}{Q_{m+1} + k_m^2 p^2 S_n \theta_{s-1}(p^2)}$$

and $$x_2 = p \frac{A_1 P_m + k_m^2 A_2 R_{n+1} \theta_{s-1}(p^2)}{Q_{m+1} - k_m^2 p^2 S_n \theta_{s-1}(p^2)}$$

$$k_m^2 \theta_{s-1}(p^2)$$

being a polynomial of the order $s-1$ in terms of $p^2$ whose highest-order term has the coefficient $$k_m^2$$

and which is defined by the equation $$k_m^2 \theta_{s-1}(p^2) = \sum_{h=1}^{s} \epsilon_h \eta_h^{2s-2} \left[ \frac{G(p^2)}{(p^2 + \sigma_h^2)} \frac{dG}{dp^2} \right]_{p^2 = -\sigma_h^2}$$

wherein $\epsilon_h = \pm 1$ and wherein $-\sigma_1^2, -\sigma_2^2 \ldots -\sigma_s^2$ represent $s$ zeros of $z_1+z_2$ selected from a maximum of $s+\beta$ thereof, and wherein further $G(p^2)$ is equal to the product $$\prod_{h=1}^{s} (p^2 + \sigma_h^2)$$

and the values of $$\eta_h^{2s-2}$$

are given by $$\eta_h^{4s-4} = -\frac{A_1}{A_2} \left[ \frac{P_{m-\mu} Q_{m+1-\nu}}{p^2 R_{n+1-\nu} S_{n-\mu}} \right]_{p^2 = -\sigma_h^2}$$

the branches $x_1$ and $x_2$ being realizable by means of a number of resonant circuits falling short by $s$ of the number of such circuits in the identical and opposite branches $z_1$ of said equivalent filter; and (b) if $n-m=s\geq 1$, the branches of said first pair are equal to $z_1$ and the branches $y_1$, $y_2$ of said second pair are given by the expressions $$y_1 = \frac{A_2 R_{n+1} - k_m^2 A_1 p^2 \theta_{s-1}(p^2)}{p[S_n + k_m^2 Q_{m+1} \theta_{s-1}(p^2)]}$$

and $$y_2 = \frac{A_2 R_{n+1} + k_m^2 A_1 p^2 \theta_{s-1}(p^2)}{p[S_n - k_m^2 Q_{m+1} \theta_{s-1}(p^2)]}$$

$$k_m^2 \theta_{s-1}(p^2)$$

being a polynomial as defined by the foregoing equation wherein, however, the values of $$\eta_h^{2s-2}$$

are given by $$\eta_h^{4s-4} = -\frac{A_2}{A_1} \left[ \frac{S_{n-\mu} R_{n+1-\nu}}{p^2 P_{m-\mu} Q_{m+1-\nu}} \right]_{p^2 = -\sigma_h^2}$$

the branches $y_1$ and $y_2$ being realizable by means of a number of resonant circuits falling short by $s$ of the number of such circuits in the identical and opposite branches $z_2$ of said equivalent filter.

3. A lattice-type, electrically symmetrical reactive four-terminal network comprising a number $\beta$ of pass bands including zero and infinite frequencies, said network being equivalent to a band-pass filter with two sets of opposite and identical branches consisting, respectively, of reactances $z_1$ and $z_2$ given by the expressions $$z_1 = A_1 p \frac{P_m}{Q_m} = \frac{A_1 p P_{m-\mu} U_\mu}{Q_{m-\nu} V_\nu}$$

and $$z_2 = \frac{A_2 R_n}{p S_n} = \frac{A_2 R_{n-\nu} V_\nu}{p S_{n-\mu} U_\mu}$$

wherein $A_1$ and $A_2$ are constants, $p$ designates the quantity $2\pi j f$, $f$ representing the operating frequency, P, Q, R, S, U and V are polynomials in terms of $p^2$, and $m$, $n$, $\mu$ and $\nu$ are integral parameters, said network comprising a first pair of identical and opposite branches as well as a second pair of unequal and opposite branches having the following characteristics: (a) if $m-n=s\geq 1$, the branches of said first pair are equal to $z_2$ and the branches $x_1$, $x_2$ of said second pair are given by the expressions $$x_1 = p\frac{A_1 P_m - k_m^2 A_2 R_n \theta_{s-1}(p^2)}{Q_m + k_m^2 p^2 S_n \theta_{s-1}(p^2)}$$

and $$x_2 = p\frac{A_1 P_m + k_m^2 A_2 R_n \theta_{s-1}(p^2)}{Q_m - k_m^2 p^2 S_n \theta_{s-1}(p^2)}$$

$k_m^2 \theta_{s-1}(p^2)$ being a polynomial of the order $s-1$ in terms of $p^2$ whose highest-order term has the coefficient $$k_m^2$$

and which is defined by the equation $$k_m^2 \theta_{s-1}(p^2) = \sum_{h=1}^{s} \epsilon_h \eta_h^{2s-2} \left[ \frac{G(p^2)}{(p^2+\sigma_h^2)\left(\frac{dG}{dp^2}\right)} \right]_{p^2=-\sigma_h^2}$$

wherein $\epsilon_h = \pm 1$ and wherein $-\sigma_1^2, -\sigma_2^2, \ldots -\sigma_s^2$ represent $s$ zeros of $z_1+z_2$ selected from a maximum number of $s+\beta-1$ thereof, and wherein further $G(p^2)$ is equal to the product $$\prod_{h=1}^{s}(p^2+\sigma_h^2)$$

and the values of $$\eta_h^{2s-2}$$

are given by $$\eta_h^{4s-4} = \frac{-A_1}{A_2}\left[\frac{P_{m-\mu}Q_{m-\nu}}{p^2 R_{n-\nu} S_{n-\mu}}\right]_{p^2=-\sigma_h^2}$$

the branches $x_1$ and $x_2$ being realizable by means of a number of resonant circuits falling short by $s$ of the number of such circuits in the identical and opposite branches $z_1$ of said equivalent filter; and (b) if $n-m\geq 1$, the branches of said first pair are equal to $z_1$ and the branches $y_1$, $y_2$ of said second pair are given by the expression $$y_1 = \frac{A_2 R_n - k_m^2 p^2 A_1 P_m \theta_{s-1}(p^2)}{p[S_n + k_m^2 Q_m \theta_{s-1}(p^2)]}$$

and $$y_2 = \frac{A_2 R_n + k_m^2 p^2 A_1 P_m \theta_{s-1}(p^2)}{p[S_n - k_m^2 Q_m \theta_{s-1}(p^2)]}$$

$k_m^2 \theta_{s-1}(p^2)$ being a polynomial as defined by the foregoing equation wherein, however, the values of $$\eta_h^{2s-2}$$

are given by $$\eta_h^{4s-4} = \frac{A_2}{A_1 p^2}\left[\frac{R_{n-\nu}S_{n-\mu}}{P_{m-\mu}Q_{m-\nu}}\right]_{p^2=-\sigma_h^2}$$

the branches $y_1$ and $y_2$ being realizable by means of a number of resonant circuits falling short by $s$ of the number of such circuits in the identical and opposite branches $z_2$ of said equivalent filter.

4. A lattice-type, electrically symmetrical reactive four-terminal network comprising a number $\beta$ of pass bands including the infinite frequency but not the zero frequency, said network, being equivalent to a band-pass filter with two sets of opposite and identical branches consisting, respectively, of reactances $z_1$ and $z_2$ given by the expressions $$z_1 = A_1 p\frac{P_m}{Q_m} = A_1 p\frac{P_{m-\mu}U_\mu}{Q_{m-\nu}V_\nu}$$

and $$z_2 = A_2 p\frac{R_{n-1}}{S_n} = A_2 p\frac{R_{n-\nu-1}V_\nu}{S_{n-\mu}U_\mu}$$

wherein $A_1$ and $A_2$ are constants, $p$ designates the quantity $2\pi jf$, $f$ representing the operating frequency, P, Q, R, S, U and V are polynomials in terms of $p^2$, and $m$, $n$, $\mu$ and $\nu$ are integral parameters, said network comprising a first pair of identical and opposite branches as well as a second pair of unequal and opposite branches having the following characteristics: (a) if $s=m-n\geq 0$, the branches of said first pair are equal to $z_2$ and the branches $x_1$, $x_2$ of said second pair are given by the expressions $$x_1 = p\frac{A_1 P_m - k_m^2 A_2 R_{n-1}\theta_s(p^2)}{Q_m + k_m^2 S_n \theta_s(p^2)}$$

and $$x_2 = p\frac{A_1 P_m + k_m^2 A_2 R_{n-1}\theta_s(p^2)}{Q_m - k_m^2 S_n \theta_s(p^2)}$$

$k_m^2 \theta_s(p^2)$ being a polynomial of the order $s$ in terms of $p^2$ whose highest-order term has the coefficient $$k_m^2$$

and which is defined by the equation $$k_m^1 \theta_s(p^2) = \sum_{h=1}^{s+1} \epsilon_h \eta_h^{2s} \left[ \frac{G(p^2)}{(p^2+\sigma_h^2)\left(\frac{dG}{dp^2}\right)} \right]_{p^2=-\sigma_h^2}$$

wherein $\epsilon_h = \pm 1$ and wherein $-\sigma_1^2, \sigma_2^2, \ldots -\sigma_s^2$ represents $s$ zeros of $z_1$ and $z_2$ selected from a maximum number of $s+\beta$ thereof, and wherein further $G(p^2)$ is equal to the product $$\prod_{h=1}^{s+1}(p^2+\sigma_h^2)$$

and the values of $$\eta_h^{2s}$$

are given by $$\eta_h^{4s} = \frac{-A_1}{A_2}\left[\frac{P_{m-\mu}Q_{m-\nu}}{S_{n-\mu}R_{n-\nu-1}}\right]_{p^2=-\sigma_h^2}$$

the branches $x_1$ and $x_2$ being realizable by means of a a number of resonant circuits falling short by $s+1$ of the number of such circuits in the identical and opposite branches $z_1$ of said equivalent filter; and (b) if $s=n-m\geq 1$, the branches of said first pair are equal to $z_1$ and the branches $y_1$, $y_2$ of said second pair are given by the expressions $$y_1 = \frac{A_2 R_{n-1} - k_m^2 A_1 P_m \theta_{s-1}(p^2)}{S_n + k_m^2 Q_m \theta_{s-1}(p^2)}$$

and $$y_2 = \frac{A_2 R_{n-1} + k_m^2 A_1 P_m \theta_{s-1}(p^2)}{S_n - k_m^2 Q_m \theta_{s-1}(p^2)}$$

$k_m^2 \theta_{s-1}(p^2)$ being a polynomial of the order $s-1$ in terms of $p^2$ whose highest-order term has the coefficient $$k_m^2$$

and which is defined by the equation $$k_m^2 \theta_{s-1}(p^2) = \sum_{h=1}^{s} \epsilon_h \eta_h^{2s} \left[ \frac{G(p^2)}{(p^2+\sigma_h^2)\left(\frac{dG}{dp^2}\right)} \right]_{p^2=-\sigma_h^2}$$

wherein $\epsilon_h = \pm 1$ and wherein $-\sigma_1^2, -\sigma_2^2, \ldots -\sigma_s^2$ represent $s$ zeros of $z_1$ and $z_2$ selected from a maximum number of $s+\beta-1$ thereof, and wherein further $G(p^2)$ is equal to the product $$\prod_{h=1}^{s}(p^2+\sigma_h^2)$$

and the values of $$\eta_h^{2s}$$

are given by $$\eta_h^{4s} = \frac{-A_2}{A_1}\left[\frac{R_{n-1-\nu}S_{n-\mu}}{P_{m-\mu}Q_{m-\nu}}\right]_{p^2=-\sigma_h^2}$$

the branches $y_1$ and $y_2$ being realizable by means of a number of resonant circuits falling short by $s$ of the number of such circuits in the identical and opposite branches $z_2$ of said equivalent filter.

References Cited in the file of this patent

FOREIGN PATENTS

| Number | Country | Date |
|---|---|---|
| 949,926 | France | Mar. 14, 1949 |